US 8,732,722 B2

(12) United States Patent
Swildens (10) Patent No.: US 8,732,722 B2
(45) Date of Patent: *May 20, 2014

(54) METHOD AND SYSTEM FOR TESTING INTERACTIONS BETWEEN WEB CLIENTS AND NETWORKED SERVERS

(76) Inventor: Eric Sven-Johan Swildens, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/477,912

(22) Filed: May 22, 2012

(65) Prior Publication Data

US 2012/0233629 A1 Sep. 13, 2012

Related U.S. Application Data

(63) Continuation of application No. 12/548,401, filed on Aug. 26, 2009, now Pat. No. 8,185,910.

(60) Provisional application No. 61/092,339, filed on Aug. 27, 2008.

(51) Int. Cl.
| | |
|---|---|
| *G06F 3/00* | (2006.01) |
| *G06F 15/16* | (2006.01) |
| *G06F 9/54* | (2006.01) |
| *G06F 11/36* | (2006.01) |
| *H04L 29/08* | (2006.01) |

(52) U.S. Cl.
CPC .......... *G06F 9/541* (2013.01); *G06F 11/3688* (2013.01); *H04L 29/08081* (2013.01)
USPC .......................... 719/310; 717/124; 719/219

(58) Field of Classification Search
CPC ................ G06F 9/541; G06F 11/3688; H04L 29/08081
USPC .......................................... 719/310; 717/124
See application file for complete search history.

(56) References Cited

U.S. PATENT DOCUMENTS

| | | | | |
|---|---|---|---|---|
| 4,941,113 | A * | 7/1990 | Dundics et al. | 702/83 |
| 6,522,995 | B1 * | 2/2003 | Conti et al. | 702/186 |
| 7,055,137 | B2 * | 5/2006 | Mathews | 717/125 |
| 7,519,954 | B1 * | 4/2009 | Beddoe et al. | 717/124 |
| 7,523,198 | B2 * | 4/2009 | Wu et al. | 709/224 |
| 2005/0120160 | A1 | 6/2005 | Plouffe et al. | |
| 2005/0160335 | A1 | 7/2005 | Peterson | |

(Continued)

FOREIGN PATENT DOCUMENTS

| | | |
|---|---|---|
| WO | WO 2007/008590 A2 | 1/2007 |
| WO | WO 2007/021836 A2 | 2/2007 |
| WO | Wo 2010/025274 A1 | 3/2010 |

OTHER PUBLICATIONS

Keir A. Fraser, The Xenoserver computing infrastructure, Jan. 2003.*

(Continued)

*Primary Examiner* — Lechi Truong
(74) *Attorney, Agent, or Firm* — Hickman Palermo Truong Becker Bingham Wong LLP; Kirk D. Wong (57) ABSTRACT

A system and method providing a testing, monitoring and debugging framework that supports testing web clients with complex and advanced feature sets. The system and method allows multiple web clients to be simultaneously tested on the same physical machine without conflict and records a full range of performance and debugging information by providing detailed measurements at a combination of application and networking layers.

18 Claims, 8 Drawing Sheets

(56) References Cited

U.S. PATENT DOCUMENTS

| | | | |
|---|---|---|---|
| 2008/0005163 A1* | 1/2008 | Bauchot et al. | 707/103 Y |
| 2008/0031151 A1* | 2/2008 | Williams | 370/252 |
| 2008/0034364 A1* | 2/2008 | Lam et al. | 718/1 |
| 2009/0150986 A1* | 6/2009 | Foreman | 726/9 |

OTHER PUBLICATIONS

PCT patent application No. PCT/US09/55223; International Search Report and Written Opinion dated Dec. 30, 2009; 13 pages.

Jerry Honeycutt, Microsoft Virtual PC, 2007.

* cited by examiner

METHOD AND SYSTEM FOR TESTING INTERACTIONS BETWEEN WEB CLIENTS AND NETWORKED SERVERS

CROSS-REFERENCE TO RELATED APPLICATION; BENEFIT CLAIM

This application claims benefit as a Continuation of application Ser. No. 12/548,401 filed Aug. 26, 2009, now U.S. Pat. No. 8,185,910, which claims benefit of Provisional Application Ser. No. 61/092,339, filed Aug. 27, 2008, the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to testing, monitoring, diagnosing problems with and recording of the interaction and the results of the interaction between web clients, such as web browsers, and networked servers, such as web servers.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The World Wide Web has experienced explosive growth from its humble beginnings as a single web site in August 1991. Within 4 years from that date, the Web had grown to over 100,000 web sites. And growth continued at a breakneck speed. Today, in 2008, there are more than 100,000,000 web sites in the World Wide Web.

As the number of web sites has increased, so has their complexity. In the early 1990s, web sites consisted mainly of static HTML pages and images. Then, in 1995, Sun and Netscape announced "LiveScript", now known as Javascript, which allowed programmers to add scripting capabilities to web sites. This was quickly followed by the addition of plugins, scripting for plugins, VBScript, DHTML, Java, ActiveX controls, AJAX, Flash and other technologies that allowed increased interactivity between users and web browsers and between web browsers and web servers.

Today, in 2008, there are a variety of different web browsers (Internet Explorer, Firefox, Opera, Safari and others) that have varying support for different technologies on many different operating systems (Windows, Linux, OS X and others). Creating and supporting a web site that operates correctly between all of them has become a complicated matter.

As the Web has grown, so have the number of businesses that depend on the Web to do business. Amazon, a company that sells products entirely off the World Wide Web, was founded in 1994 just 3 years after the debut of the first web site. In 2007, only 13 years later, Amazon's revenue was over 14 billion dollars from Internet sales.

Countless other businesses have been started to make money using the World Wide Web. Some make money selling products, while others sell services or make money via advertising. In all cases, these businesses need to ensure their web sites stay up, perform well and don't have errors that would cause users to become frustrated or unable to use their service.

As the need to ensure that web sites perform well has grown over time, companies have formed to develop and sell products and services that aid individuals to monitor the performance and availability of web sites and debug problems associated with them. Some of these companies sell their tools as a software product that users can run on their own machines. Other companies sell hardware products and still others sell services that help individuals monitor web sites over time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
3.0 Testing
   3.1 Test Agent
   3.2 Scheduling Tests
   3.3 Billing
4.0 Implementation Mechanisms—Hardware Overview
5.0 Examples
6.0 Extensions and Alternatives

1.0 General Overview

A method and system for testing interactions between web clients and networked servers is described. In a possible embodiment, a computer network with a number of testing agents, one or more scheduling agents and one or more data query agents deployed on machines to provide testing, monitoring and debugging services for users requesting such services are provided. The computer network allows the system to replicate the experience of end users using their own web clients in as accurate a manner as possible.

Companies that offer monitoring services generally operate by having a number of servers on the Internet that connect to a specified web site, download portions of the specified web site and record the availability and performance of those operations over time.

Some implementations have a network of machines located around the Internet that download web pages and records their availability and download. They also provide a minimal set of debugging tools. These implementations use a couple of different methods to download web site pages and associated content. One uses custom software developed by Keynote to simulate a web browser and another uses an actual Internet Explorer web browser.

Another implementation uses web browser plugins that operate on actual users' machines as well as machines in their own network. The web browser plugins monitor the performance and availability of web sites and associated content and the resulting data is presented to customers who sign up for the service.

Yet another implementation initially performed client/server and application testing and load testing and moved into web site monitoring and testing as the web expanded. Like the other implementations, it operates a network of machines at various points on the Internet that perform testing as part of HP's Global Monitor Service.

Services that were designed to test and monitor web sites in the late 1990s tended to develop their own custom testing agents to perform testing. These agents simulated actual web clients, such as web browsers. As web client functionality became more complex in the 2000s, functionality was added to these custom clients but it became extremely difficult to simulate all the capabilities of the various web clients as they became more complex. The advent of Web 2.0 technologies, such as AJAX, Flash and ActiveX, and their heavy use have caused most custom made testing agents to be very limited in the subset of functionality they are able to actually test. The ability to test a complete transaction between a web-client and networked server is also increasingly important and this is more difficult with custom developed testing agents.

Services that were designed to use actual web clients and instrument them to determine performance and availability issues have been able to more easily keep up with technological changes. However, instrumenting an actual web client to perform testing has a number of its own issues.

Existing systems that instrument actual web clients have a good view into application layer performance and network request/replies but do not provide a view into low level networking such as ICMP traffic, actual TCP/IP retransmits, out of order networking packets, transmission of individual DNS packets, etc. This type of information is available at the low level operating system network layer but not available at the application layer. Instrumenting a web client at the application layer alone does not allow a service to detect specific issues at the lower networking layers.

"Sniffing" lower level networking traffic, while instrumenting the application layer of a web client for testing, is possible. However, if multiple web clients are running on the same machine, it can be difficult or impossible to correctly determine which web client is associated with specific low level network traffic in existing testing architectures.

Many web applications, such as web browsers, were designed to only be operated by one single user at a time. When running a testing and monitoring service, multiple customers may want to be assigned to one machine. If this one machine is used by two customers at the same time and two web clients are used at the same time, the clients may conflict with each other in a number of ways.

For example, if the web client is a web browser, two instances of the same web browser will share the same content cache. They will also share the same set of "cookies". This is just one of many possible sources of conflicts. Other sources include one instance of the web client using up too many system resources, such as memory or CPU time. Or one instance of the web client encountering errors due to a test, causing other tests that may be going on with different clients on the same machine to fail even though they wouldn't if they were executed on a standalone basis.

Services that provide testing and monitoring of web clients on the Internet usually run agents or web clients at multiple locations on the Internet so a customer may determine and compare performance and availability from multiple locations. If single tests are performed at a time on individual machines where all machines are of the same type (e.g., CPU, memory, etc.) then reasonable comparisons can be made between the results of different locations. However, if the testing machines vary in type or if multiple agents or web clients are run on individual machines, comparing the results of two locations will not allow a customer to accurately determine if an issue is one in the network or if the issue is as a result of the differences between the machines in the two locations.

A possible embodiment provides a testing, monitoring and debugging framework that supports testing web clients with complex and advanced feature sets. A possible embodiment allows multiple web clients to be simultaneously tested on the same physical machine without conflict and records a full range of performance and debugging information by providing detailed measurements at multiple networking layers.

A possible embodiment utilizes hardware virtualization on the machines hosting the testing agents. Individual test agent machines in the network run either a host operating system with virtualization software or a virtualizing operating system. Virtualization allows multiple, independent, guest operating systems to run on a single piece of physical hardware.

As part of the test agents, web clients are run as processes in one of the guest operating systems. These web clients are instrumented at the application layer to provide and record performance and debugging information. Additionally, network layer operations at the network layer of the guest operating systems are recorded to provide additional debugging and performance information. Because a guest operating system is used for each web client, it is clear which low level network traffic is associated with each web client.

A centrally located scheduler or a scheduler agent existing on or near the test agent machines schedules tests to perform at regular intervals. The types of tests to run and schedule are based on the tests that have been requested by end users of the system. Historical diagnostic and performance data can be stored in text or binary files or in a database by the scheduler as the scheduler commands test agents to perform tests and obtains results from the test agents.

Users that want to use the features of the system use a web based user-interface deployed on a user-interface server that allows them to sign up for the service and add and/or modify tests for scheduling.

To display historical data or while debugging, the user-interface server contacts a data query agent. The data query agent is responsible for responding to queries about the diagnostic and performance data that was recorded by the test agent software on the test agent machines.

The foregoing outlines some of the salient features of the present invention. These features are illustrative of the main features of the invention; however there are additional features of the disclosed invention that will be apparent from the following description and drawings. In addition, many other benefits may be attained by applying or deploying the disclosed invention in a different manner.

2.0 Structural and Functional Overview

Figure 1:
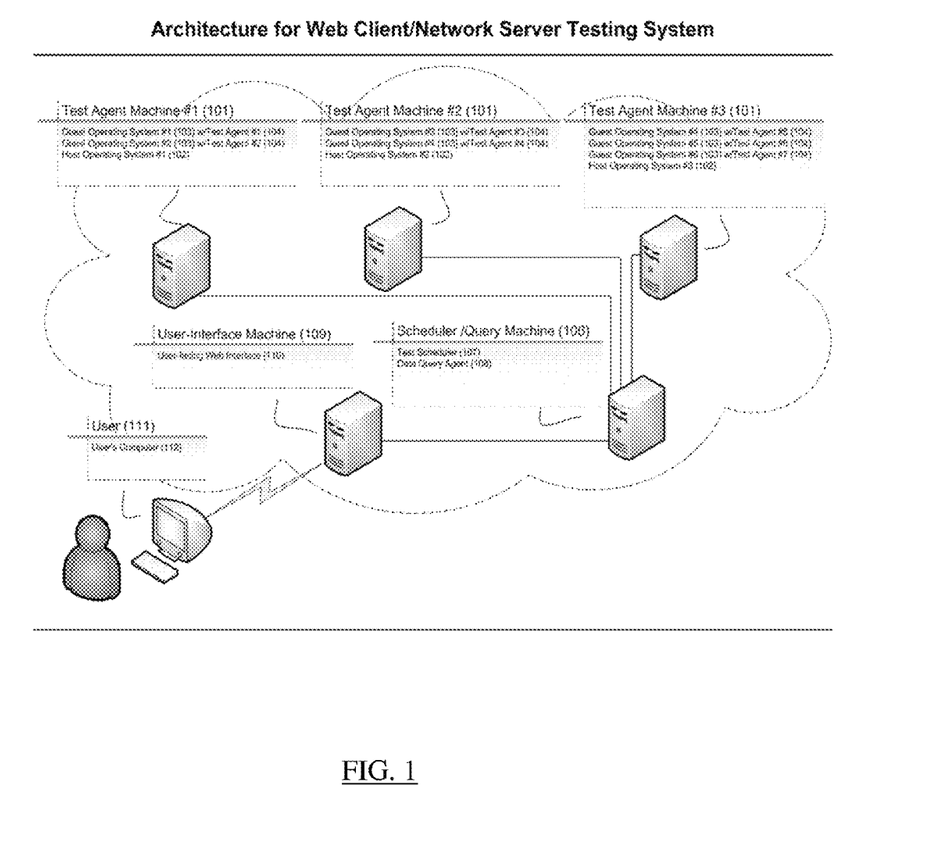
FIG. 1 illustrates a block diagram of an architecture for a web client/network server testing system, according to a possible embodiment of the invention.

A possible embodiment of a web client/network server system is shown in FIG. 1. Each Test Agent Machine 101 is one of a plurality of testing machines connected to a network. A representative machine includes one or more processors, a Host Operating System 102 or virtualization base system, one or more Guest Operating Systems 103, one or more storage devices and test agent software. A representative network is the Internet, an intranet, an extranet or any other known network.

A Test Agent 104 is a process or thread running on an Agent Machine 101. A Test Agent 104 is contacted by a Test Scheduler 107 process or thread when a test is needed to be performed. To perform a test, a Test Agent 104 executes a web client or accesses a running web client to be tested and commands it to perform operations that query other servers for information. Requests, responses, availability and performance information about the behavior of the web client are recorded at both the application layer and networking layer of the Guest Operating System 103 during the process of sending requests and getting responses. Portions of the recorded performance and availability data may be returned to the Test Scheduler 107 for storage in a file system or in a separate database. Other data may be stored locally by the Test Agent 104 in either the Guest Operating System 103 filesystem or the Host Operating System filesystem 102.

In a possible embodiment, a Scheduler/Query Machine 106 is connected to a network. A representative machine includes one or more processors, storage, a host operating system and Test Scheduler 107 and Data Query Agent 108 processes or threads. In other possible embodiments, the Test Scheduler 107 and Data Query Agent 108 may be running on separate machines. Additionally, there may be primary and backup Scheduler/Query Machines 106 with a mechanism in place so if a primary machine fails, the backup takes over. In other possible embodiments there may be multiple Scheduler/Query Machines 106 with load balancing between them to allow the system to scale and handle larger numbers of requests. In still other possible embodiments, there may be multiple Scheduler/Query Machines 106 where each machine is assigned to contact a subset of the total Test Agents 104 in the network as a method of allowing the system to scale to handle large numbers of requests.

The Test Scheduler 107 process or thread on Scheduler/Query Machine 106 directs Test Agents 104 by contacting them when a test needs to be performed and providing instructions on what tests to execute, how to execute them and when to perform them. The Test Agents 104 perform the tests and data are recorded while the test is run. The Test Agent 104 may return data about the test to the Test Scheduler 107 when a test is run and the Test Scheduler 107 may store the resulting information in local storage or in a database. The database may be a SQL database running on another machine or it may be a database running on the Scheduler/Query Machine 106 itself.

The Data Query Agent 108 is a process or thread running on the Schedule/Query Machine 106. The Data Query Agent 108 handles requests for stored data from the User-Interface Machine 109. Typically, these requests are requests for data over some time range from a test that was run in the past. To generate a response to a query from the User-Interface Machine, the Data Query Agent 108 may obtain data from where data was stored by the Test Scheduler 107 (that is, in local storage or a database). Additionally, for data which was not returned to the Test Scheduler 107 but instead was stored on the guest or host operating system of one or more Test Agents 104, the Data Query Agent 108 may contact one or more Test Agents 104 to obtain data. In another embodiment, the Test Agent Machines 101 may be running a small query agent process or thread themselves that the Data Query Agent 108 could contact instead of contacting a Test Agent 104. These small query agents would be responsible for responding to Data Query Agents 108 and filtering data stored on a local Test Agent Machine 101 to respond to requests.

In a possible embodiment, a User-Interface Machine 109 is connected to the network. A representative machine includes one or more processors, storage, a host operating system and web server software providing a User-facing Web Interface 110. Users use the Web interface on the User-Interface Machine 109 to schedule tests and view results. Results are presented in graphical form with charts and graphs, and tabular form. The User-Interface Machine 109 contacts the Data Query Agent 108 to obtain the data it uses to create charts, graphs and tables. When a user changes test parameters or schedules a new test, the User-Interface Machine 109 contacts the Test Scheduler 107 to schedule a new test or modify the parameters for an existing test. In another possible embodiment, a backup User-Interface Machine 109 may exist that would be utilized if the primary failed. In still another possible embodiment, a set of User-Interface Machines 109 could be deployed with a load balancer to distribute the load among them, allowing the system to scale and handle a larger number of requests.

The User 111 is an individual who wants to set up, modify or view the results of tests. The User 111 uses web browser software on User's Computer 112 to contact the User-Interface Machine 109 to set up, modify or view the results of tests performed by Test Agents 104. For illustrative purposes, an example User's Computer 112 is a personal computer including web browser software such as Microsoft Internet Explorer and an operating system, such as Windows Vista. The User's Computer may also be a notebook or handheld computer or similar device that includes a web browser.

3.0 Testing 3.1 Test Agent

Figure 2:
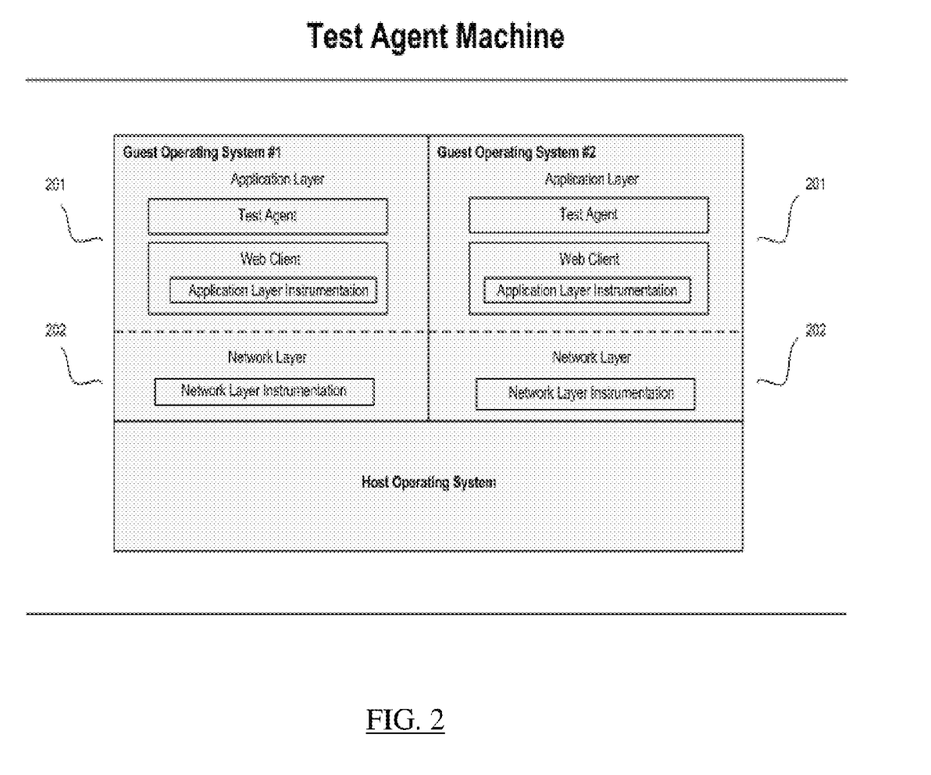
FIG. 2 illustrates a block diagram of a test agent machine, according to a possible embodiment of the invention.

A Test Agent Machine is shown in FIG. 2. Test Agent Machines are preferably placed in multiple network locations so as to be able to provide diagnostic information concerning varying routes on the network. A typical location for a Test Agent machine when testing web clients would be an Internet co-location facility. The Test Agent Machine itself may include multiple CPUs or multi-core CPUs and a storage device such as a hard disk drive. Multiple hard disk drives may be used with RAID to allow the machine to continue to operate and prevent data loss if one or more disks fail.

Test Agent Machines run virtualization software. This software can either exist as its own host operating system, as is the case with VMWare's ESX virtualization product, or it may reside on top of an existing operating system as is the case with Microsoft Virtual Server 2005, Microsoft's Windows Server 2008 with Hyper-V or the VMware Server product. In the case where the virtualization software runs on top of an existing Host Operating System, a representative Host Operating System may be Microsoft's Windows Server or one of the many variants of the Linux operating system.

A Test Agent Machine with virtualization typically runs more than one guest operating system. A representative Guest Operating System may be Microsoft Windows XP, Microsoft Windows Vista or one of the many variants of Linux. An individual Test Agent Machine may contain multiple types of operating systems and multiple versions of a given operating system. The Guest Operating System contains Test Agent software and also web client software to be tested. The Test Agents either execute web client programs to test the web client programs or access existing running web client programs when performing a test. Representative web client software may be web browser software such as the Microsoft Internet Explorer, Firefox, or Opera web browsers. Other examples of web client software are streaming media clients such as Macromedia Flash players, Windows Media Players, or other clients that use the World Wide Web as a client to communicate. A given Test Agent Machine may contain many different types of web client software and may contain many different versions of a given type of web client software.

The Guest Operating Systems running on Test Agent Machines may be normalized so a test that utilizes multiple Guest Operating Systems on multiple Test Agent Machines returns results from different Test Agents that may be reasonably compared against each other. If one Test Agent Machine has a hardware processor that is 2× as fast as another, for example, the amount of processor time scheduled to the Guest Operating System on the faster machine may be set to half of that at another. This would help normalize the CPU power during the test between the two machines so the results may be compared without having to consider the differences between CPU power/speed on the two machines. Similarly, other actual hardware resources could be assigned proportionally to a Guest Operating System on a given machine to try to match the capabilities of the Guest Operating Systems on other machines. This normalization can help diagnose problems and when looking at performance from multiple machines because it helps remove variability between hardware performance as an issue of consideration.

Guest Operating Systems running on Test Agent Machines have multiple levels of communication. These levels can be broken down as in the Open Systems Interconnection Basic Reference Model (OSI) Seven Layer Model. Specifically, the OSI Seven Layer Model contains Application, Presentation, Session, Transport, Network, Data Link and Physical Levels. To simplify the discussion, the seven levels will be collapsed into just two, an "Application Layer" 201 and "Network Layer" 202. The Application Layer 201 corresponds to levels 5-7 of the OSI Seven Layer Model (Application, Presentation and Session) and the Network Layer 202 corresponds to levels 1-4 of the OSI Seven Layer Model (Transport, Network, Data Link and Physical).

Application Layer 201 operations may be monitored when an application itself is monitored. More specifically, an application, such as a web client application, may use sockets to communicate with a server. Monitoring this type of communication would be monitoring the Application Layer 201 communication of the web client process or thread. The Network Layer 202 is not available to be monitored by monitoring an application process or thread. Instead, monitoring the operating system kernel is required. Monitoring the Network Layer 202 allows visibility into actual IP packets sent and received on the network. Individual retransmitted packets (because of packet loss) could be viewed by monitoring the Network Layer 202 on the machine but are not available when monitoring the Application Level 201 of an operating system. Similarly, the effects of a certain type of data being returned by a server cannot be monitored at the Network Layer 202 and must be monitoring by looking at the Application Layer 201. In the preferred embodiment, when a test is performed by a Test Agent, both the Application Layer 201 of the web client and Network Layer 202 of the Guest Operating System the Test Agent is running in are monitored and data is recorded.

Activity at the Application Layer of a web client may be monitored during a test in a number of ways. For Guest Operating Systems running Microsoft Windows and an Internet Explorer web client, a Browser Help Object (BHO) could be used to monitor the activity of the web client as it executes. An Internet Explorer web client could also be monitored via a browser plugin or it could be monitoring by obtaining the handle to a Window and looking for Windows messages. Other ways of monitoring the Application Layer under Microsoft Windows including using a proxy such as Microsoft's Fiddler Proxy to allow the monitoring of HTTP and other traffic as it passes to and from the web client. Still other ways of monitoring a web client under Windows include intercepting Win32 function calls, such as those for socket communication, encryption and user-interface rendering. Using Win32 interception can preserve original function calls by using trampoline code. Similar to Win32 function intercepting, proxying Dynamic Link Libraries (DLL) could be used. These DLLs would take the place of existing application or operating system DLLs and code would be added to the proxy DLL to trace calls as they are execute. The DLL that was replaced would be called by the proxy to perform actual work. Still another way of monitoring an application is to use a debugging interface to attach to a running process or thread and capture data as functions in the process or thread are executed. Further methods of monitoring the Application Layer of a web client under Windows include capturing areas of the screen before, during and/or after the test.

These monitoring methods are not specific to Microsoft Windows. Under operating systems other than Microsoft Windows, similar methods can be used. Under Linux, for example, a proxying shared library could be written instead of a proxying DLL that would operate in the same manner as a proxying DLL. Application or system level functions could be intercepted by rewriting function addresses to point to a custom function that would record information and call an original function as under Microsoft Windows. Additionally, in any operating system, if the source to a web client is available, the source may be modified to add code that allows the web client to be monitored at the Application Layer during the test.

Activity at the Network Layer of a Guest Operating System may be monitored during the test in a number of ways as well. Various versions of Microsoft Windows contain the ability to write a packet filter that allows a program to capture and accept or reject packets as they are sent and received by the operating system. This capability can be used to monitor packets as they are sent and received. All operating systems have the ability to "sniff" for packets. That is, to view all the packets sent and received by an operating system. There are many programs that exploit this ability. Under Microsoft Windows, there are programs such as Ethereal or Windump that capture packets in this manner. Under Linux, there are programs such as snoop and tcpdump. Other operating systems have similar programs. Code that operates in the same manner as these programs or the programs themselves could be used to record activity at the Network Layer during a test. Alternatively, if source to the operating system is available, monitoring code could be added to the operating system itself and the operating system rebuilt to obtain information about the Network Layer during a test. Additionally, to facilitate DNS debugging during a test, a local DNS server could be run in the Guest Operating System itself to allow monitoring of DNS activity to and from the local DNS server during the test.

A Test Agent interacts with a web client to perform a test. This interaction includes interacting with the web client just as a user would if they directly interacted with the web client. The Test Agent may simulate button presses, cursor movement and/or keyboard entry. Data may be entered into fields as a user would enter it and buttons pressed to submit the information. The Test Agent supports scripting, allowing the agent to perform multiple actions, look for information in a reply and then perform subsequent actions based on the content of the reply. For example, a Test Agent may enter a URL in a web browser and then enter information into a text field on a HTML page returned by a contacted web server and then press a Submit button to submit that information and subsequently look for information in the reply and generate a new transaction based on that reply. Additionally, the scripting can include commands to check the response from a server contacted by the web client to determine if a test passed or failed. These multiple interactions may be programmed by a test writer using the Test Agent scripting language to write the test or it may be recorded by a test writer by using a client on their machine to record the interaction that occurs during the test and then submitting that recorded interaction for the Test Agent to replay.

During a test, information at the Application Layer and Network Layer can be recorded to check performance and availability of the tested components and aid in diagnosing errors related to those components. The Test Agent drives this process. Information recorded at the Application Layer including taking full or partial page screen captures or window captures of the web client being tested. Additionally, at the Application Layer, all socket communication and the data used by the web client after it has been processed can be stored. For a web browser, this may include storing all the content downloaded by the web browser as the web browser would see it. For a web site, this would include storing all the HTML and images that were accessed by the web browser during the test. Additionally, all requests and responses at both the Application Layer and Network Layer are recorded during the test.

To save space on storage devices, only data which is different between two test runs may be actually stored on a storage device. If a screen or window capture is the same between two tests, it need not be stored twice. In the case of a duplicate screen or window capture, only a reference to an original need be stored on a storage device. Similarly, if only a portion of a screen or window capture is different, a reference to the original and only the image portions that are different may be stored. The same is true for all types of test data stored. Duplicate HTML pages, for example, may be stored as just a reference to original stored HTML pages. And if only a portion of a HTML page changes from one test to the next, a reference to the original and the differences may be stored instead of storing the entire page on a storage device.

In a possible embodiment, when recording activity at the Network Layer, all packets transmitted to and from the Guest Operating System running the web client are recorded and stored in their raw format. This allows an individual investigating a test to view items such as individual retransmitted packets, ICMP traffic, individual DNS request/responses and other data that is not available when monitoring the Application Layer alone.

Test Agents are contacted by Test Schedulers when a test needs to be performed and data about a test should be recorded. Any test script or parameters of the test are sent to the Test Agent by a Test Scheduler when a test is to be performed. Depending on the type of data that is recorded during the test, portions of test data may be stored on the Test Agent machine in either the Test Agent's Guest Operating System's file system and/or the Host Operating System's file system on the Test Agent Machine, and other portions may be returned to the Test Scheduler for storage on its attached storage device or database.

If a Test Agent encounters an error condition during a test, the Test Agent may choose to perform additional tests to further diagnose a problem. For example, if it is possible a router connection is broken, a Test Agent may send ICMP packets with varying TTLs out on the network and look for ICMP No Port replies in a manner similar to traceroute. This more specific, additional diagnostic information is recorded along with the other information recorded during a test and stored in the same manner.

In alternative possible embodiments, the Test Scheduler may diagnose error conditions and direct Test Agents to perform additional tests if it discovers an error condition. Or some error conditions can cause additional tests to be performed by Test Agents and others by Test Schedulers directing Test Agents based on either the error type or scripting submitted by the test writer.

3.2 Scheduling Tests

Figure 3:
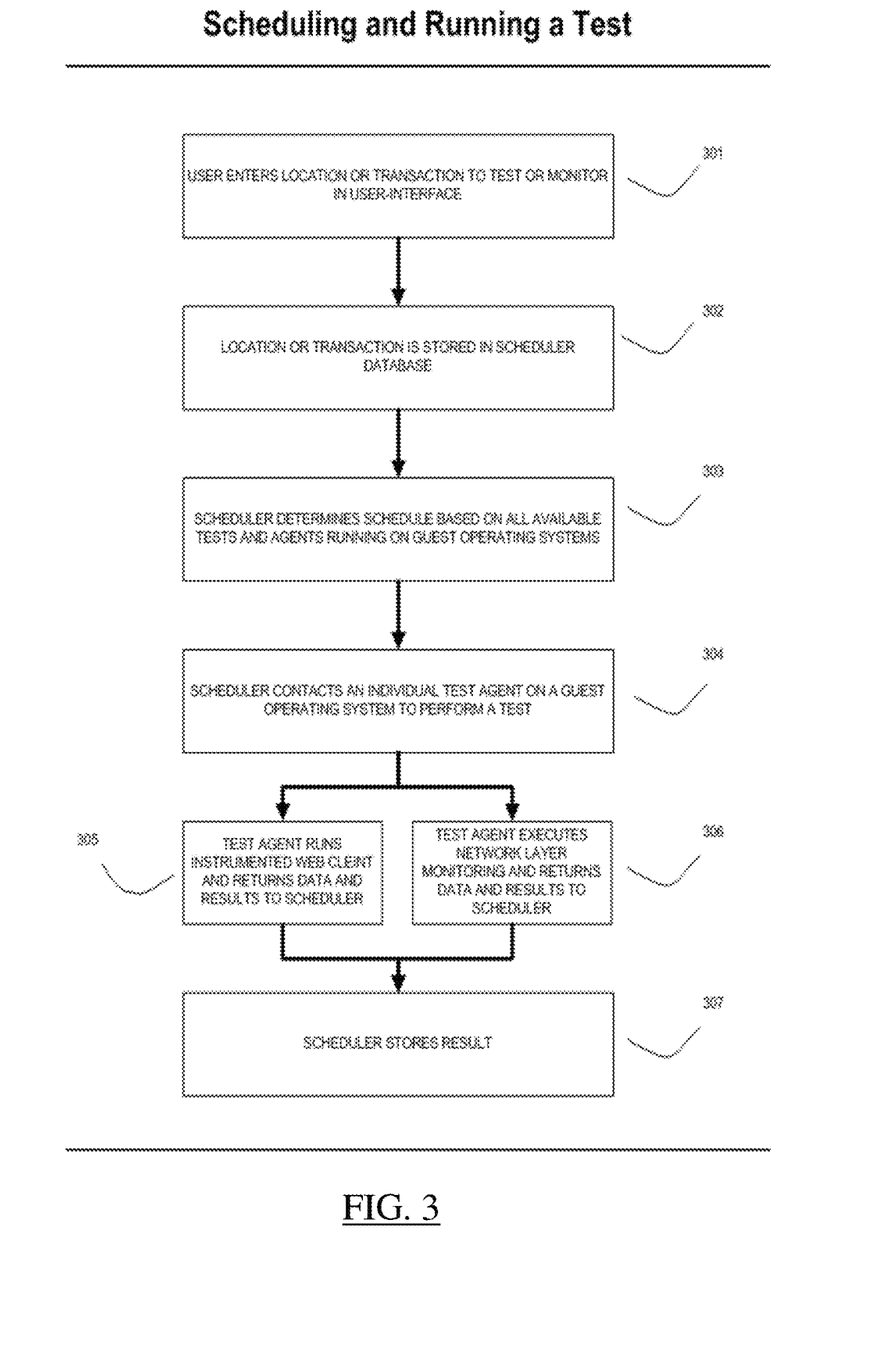
FIG. 3 illustrates a flowchart of a workflow for setting up and running an individual test in a web client/network server testing system, according to a possible embodiment of the invention.

FIG. 3 illustrates scheduling and running of an individual test in a possible embodiment. Users come up with tests that they want the system to perform. Firstly, the User defines what is to be tested. This definition is provided to the system by the user either entering an item to be tested by its location (as an example, by giving a URL) or by providing a script describing the test to be performed and its parameters 301. Additionally, the User could record a transaction and then provide that transaction to the system to replay as a test.

The User provides the test information to the User-Interface Machine which, after validation, it provides to the Test Scheduler. The Test Scheduler stores the information regarding the test to be run in the local filesystem or database 302. Given all tests to be run and the various Test Agents in the network, the Test Scheduler comes up with a schedule determining when individual Test Agents should run individual tests 303. A scheduling algorithm could be as simple as just scheduling the tests in the order they were added. As the system scales larger, more complex scheduling algorithms would be added as scheduling options.

After determining a schedule, the Test Scheduler contacts individual Test Agents to perform tests 304. The Test Scheduler communicates all the information that is needed to run the test to the Test Agent and the Test Agent uses this to run the test. The Test Agent executes or accesses a running web client 305 and ensures that data is recorded at the Network Layer of the Guest Operating System during the test 306. The Test Agent returns information about the test run back to the Test Scheduler which, in turn, stores the result 307.

A User may set up a way to be contacted if certain conditions are found when running a test. For example, if a User wants to be contacted if a test fails, they may enter the condition to be contacted in the user-interface along with the information on how to be contacted. Contact may be by SMS message, page, email or automated phone call. Similar to scheduling a test, the User-Interface would send the contact condition to the Test Scheduler where the condition would be stored in the same manner as storing a test. When a test is run, the condition is checked and if it matches, the Test Scheduler performs the requested operation to contact the User. For example, a User could set up a contact condition stating that if a test fails on more than 2 Test Agents at once, an email should be sent. If a Test Scheduler encounters this condition when running a test, the Test Scheduler would contact the User by sending an email.

Figure 4:
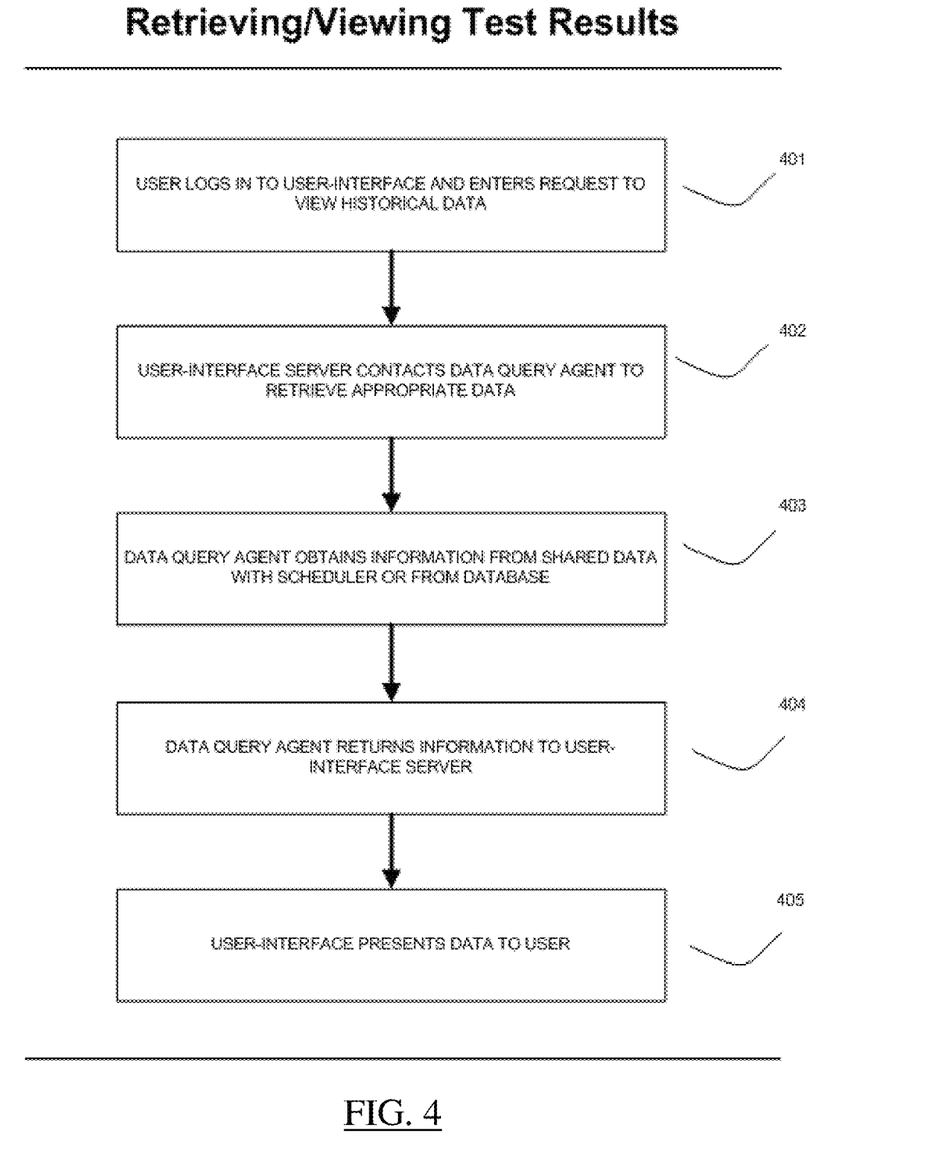
FIG. 4 illustrates a flowchart of a workflow for retrieving and viewing test results in a web client/network server testing system, according to a possible embodiment of the invention.

The flowchart shown in FIG. 4 illustrates specific steps to retrieve and view test results included in the preferred embodiment. A User may view test results by logging into the User-Interface machine with a web browser and entering a request to view historical data 401. When a request to view data is received from a User by a User-Interface Machine, the User-Interface Machine contacts the Data Query Agent 402 to obtain the raw data needed to generate tables, draw charts and graphs and present information textually to the User. In the preferred embodiment, the Data Query Agent contacted obtains the raw information about historical test runs from a shared data store with the Test Scheduler 403. In another embodiment, the Data Query Agent would contact a database either on the same physical machine or on its own machine that is used to store historical test data.

Once test data is obtained from the shared data store, the Data Query Agent returns test information to the User-Interface Machine 404 and, after receiving data, the User-Interface Machine presents the data to the User 405.

The User-Interface Machine performs the work of turning raw data into various types of charts, graphs and tables. The User-Interface Machine may develop the interface using a LAMP software (Linux/Apache/MySql/PHP), Microsoft's ASP.NET or other similar product suite. Additionally, to allow a higher degree of interactivity with the User, the User-Interface Machine may implement AJAX (Asynchronous Javascript and XML). Interactive AJAX calls cause the User-Interface to make asynchronous calls to the Data Query Agent to obtain data when updating the display.

Figure 5:
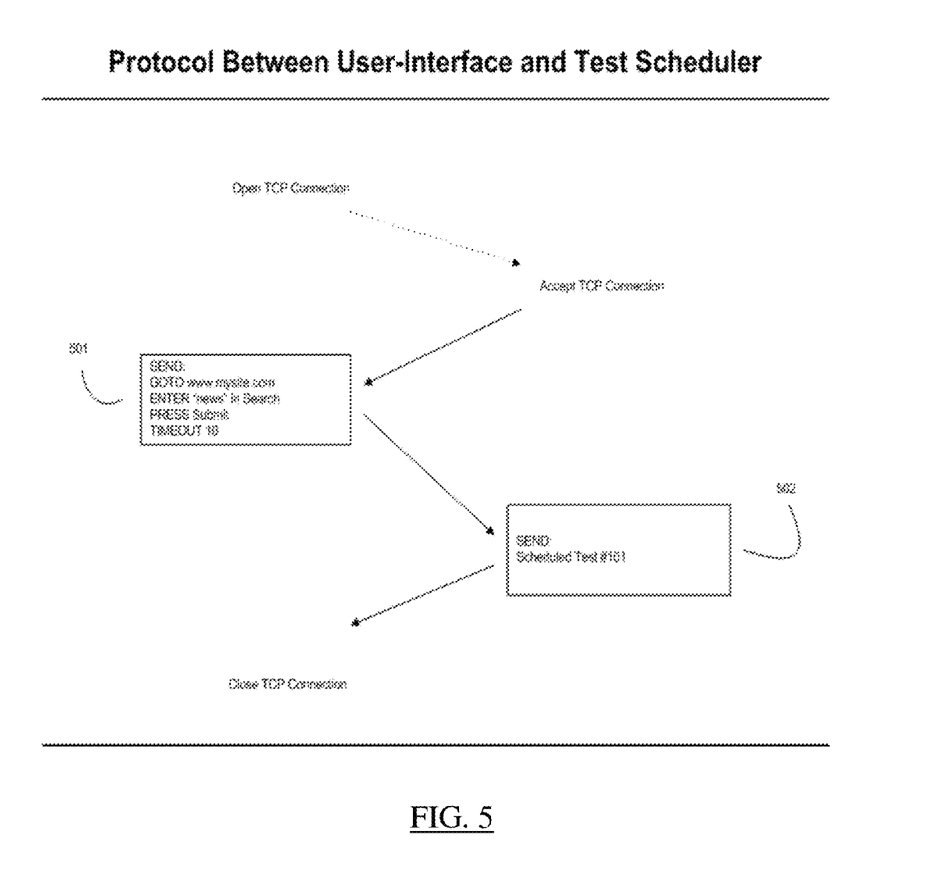
FIG. 5 illustrates an example protocol between user-interface and scheduler, according to a possible embodiment of the invention.
Figure 6:
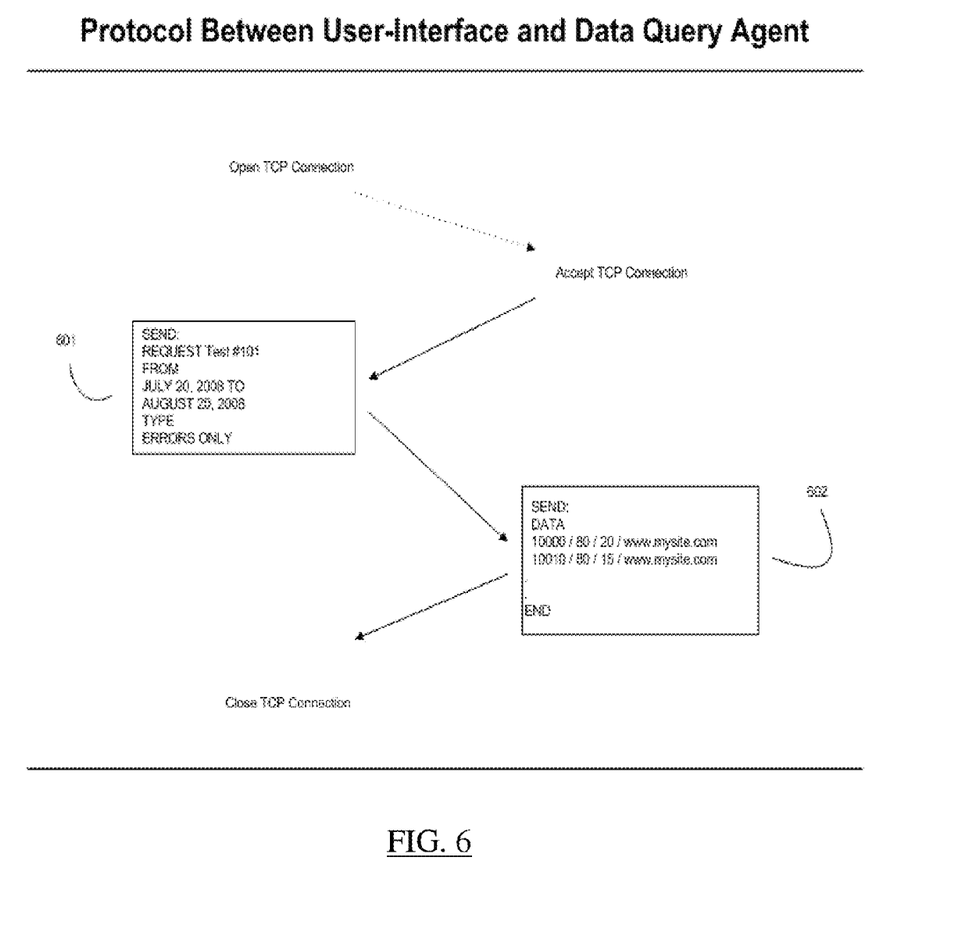
FIG. 6 illustrates an example protocol between user-interface and data query server, according to a possible embodiment of the invention.
Figure 7:
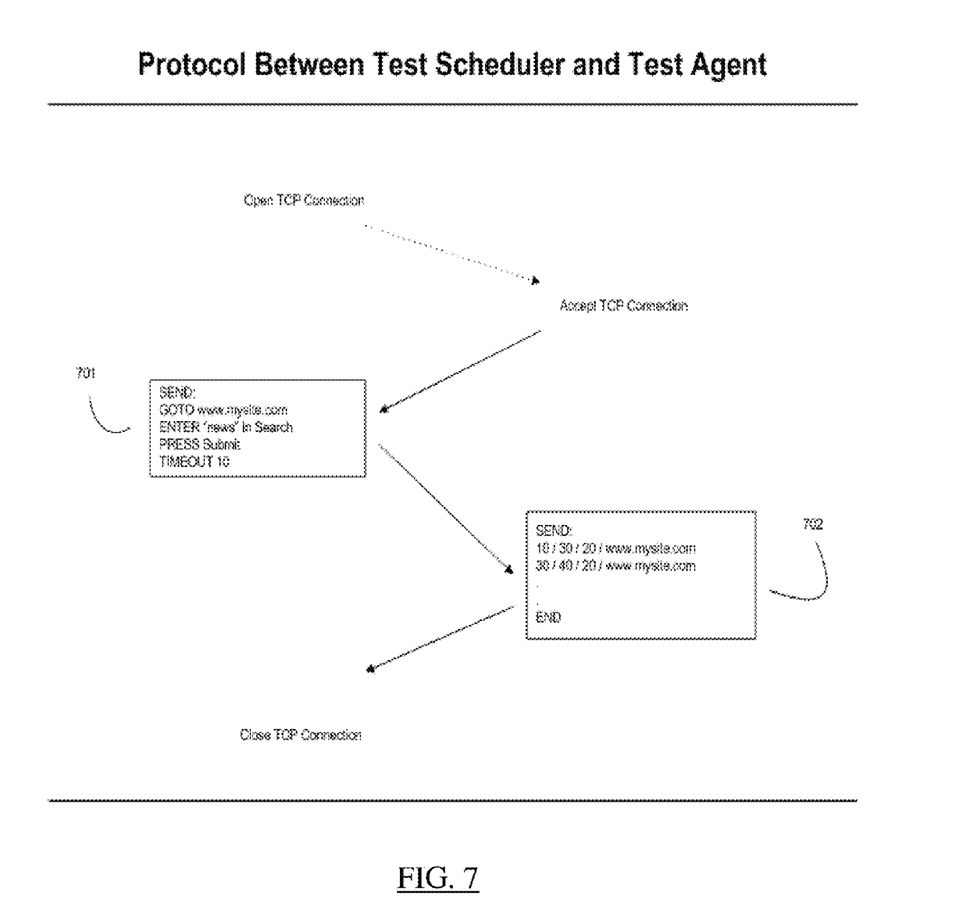
FIG. 7 illustrates an example protocol between scheduler and test agents, according to a possible embodiment of the invention.

The communication protocols for steps described in FIGS. 3 and 4 are shown in more detail in FIGS. 5-7. In a possible embodiment, the protocol between the User-Interface and Test Scheduler to set up a test is shown in FIG. 5. First, a TCP connection is established to communicate between the User-Interface Machine and Test Scheduler. Then, the User-Interface Machine sends the Test Scheduler the script and/or parameters for the test to be scheduled 501. The Test Scheduler can then validate the test, ensure there are resources available to schedule it and respond with a newly created test identifier if the validation is successful and resources available 502.

Similarly, in a possible embodiment, the protocol between the User-Interface and Data Query Agent to obtain test results is simple as shown in FIG. 6. First, a TCP connection is established to communicate between the User-Interface Machine and Data Query Agent. Then, the User-Interface Machine sends the request for test data given one or more test identifiers along with a time range (if applicable) and other parameters to the Data Query Agent 601. In response to the request, the Data Query Agent returns the appropriate data 602.

In the preferred embodiment, the communication between the Test Scheduler and Test Agent is also TCP based. First, a TCP connection is established between the Test Scheduler and Test Agent. Then the Test Scheduler sends a request to perform a test including a test script, if required and all parameters required to perform the test 701. The Test Agent performs the requested test and responds with detailed or aggregated test results 702.

Below is a summary of some benefits of possible embodiments.

1. Tests the Entire Transaction at Both the Application and Network Layers

Competing solutions that test only a partial transaction or that test only the Application or Network Layer don't provide as robust an ability to diagnose problems. A partial view can lead to inaccurate interpretation of results and inability to diagnose problems. With a possible embodiment, the entire transaction is tested and recorded at both the Application and Network Layers to allow for more accurate diagnosis of performance issues and problems.

2. Reports Accurately on Current Technologies

Many competing solutions were designed in the late 1990s before the advent of more advanced Internet/Web Server technologies, such as Flash and AJAX. They focus primarily or solely on measuring specifics important for static content or simple animated content. They primarily measure at the Application Layer, tracing HTTP activity, looking at request and response time at that level. This does not give an accurate picture of the performance of advanced technologies that require complex processing on both the client and the server. The inventive design of the present invention allows for replication of the entire user experience, providing much greater insight into end user experience.

3. Usage of Virtualization to Accurately Measure Web Client Performance when Multiple Tests are Executed on a Single Physical Piece of Hardware.

The use of Guest Operating Systems and virtualization allows testing at the Network Layer to be recorded and associated with a specific web client without complex and error prone mapping of Application Layer communication to Network Layer communication. The use of virtualization also prevents multiple tests running at the same time from interfering with each other because physical resources are virtualized and web client utilization of virtual resources are separated from each other. For example, one test allocating too much memory and running their Guest Operating System low on memory will not affect another running test.

4. Scales Cost-Effectively

The use of virtualization and the design of the system allows it to scale cost effectively. As the system scales, more Test Schedulers and Test Agents may be deployed. Test Schedulers can be assigned disjoint sets of Test Agents to utilize. Multiple User-Interface Machines may be deployed. Without this type of architecture, competing solutions may be required to deploy many more new machines if only a single test could be executed at a time on a single physical machine or CPU core. Those types of architectures have a cost effectiveness barrier that prevents their solution's success. The inventive scheduling and testing framework allows the present invention to provide accurate and effective results in a cost effective, scalable manner.

In the foregoing specification, the invention has been described with reference to specific embodiments. It is, however, evident that various modifications and changes may be made thereto without departing from the broader spirit and scope of the invention. The specification and drawings are, accordingly, to be regarded in an illustrative rather than a restrictive sense.

3.3 Billing

A customer desiring to test, monitor, and diagnose network server performance could be required to subscribe to the service in a possible embodiment. The subscription process could involve the collection of data from the customer through a web-interface, or telephone, email or facsimile transmission, for example. An initial free trial period could be used to entice customers to try the service. The subscription process could also allow the customer to provide their billing information, such as credit card information or purchase order details, to the service.

Various subscription types could be envisioned within a possible embodiment. The number, type and frequency of access, tests, and other information provided could be determined by the type of subscription purchased, such subscription could allow a given number of accesses or tests in a billing cycle. A billing cycle could be a week, month, quarter, or other time period. Alternately, each test or service could be charged separately with a standard fee to the customer. Under either option, advanced or optional test or reporting features could be provided at an additional charge.

Charges to the customer's billing information could be created systemically by a possible embodiment. A credit card could be charged, or an invoice generated, immediately and automatically based on the delivery of customer requested services. Alternately, transactions could be consolidated over a billing cycle and charges calculated at the end of each cycle, with a systemic charge to the billing information provided by the customer. Invoices or reports on credit card charges could be generated at the time the charge is created, or consolidated to a standard billing cycle, and then could be sent to the customer via mail, electronic mail, facsimile transmission or other mechanism.

A possible embodiment can permit one or more resellers of the service to use the core functionality of the service while marketing and branding it under another name. In this possible embodiment, a customer would initially subscribe to, and later log in to, an interface that displays the name of the reseller and not the name of the core service provider. Additional modifications and enhancements to the user-interface could be implemented to further customize the experience for the reseller's customers. The modified user-interface would collect requests and information from the customer and be submitted to the appropriate system part of the present invention in a manner consistent with the invention's standard performance without a reseller. The system would further provide data back to the modified user-interface designed for customers of the reseller such that when viewing results the customer would see those results on a page with the reseller's name and possibly additional configuration changes requested or performed by the reseller.

The subscription and billing processes for a customer who signs up through a reseller could be modified from the standard procedures, to allow additional options and variant pricing. The charges for the customer of the service could be charged to the reseller, allowing the reseller to charge their customer, or alternately charged to the customer on an invoice or credit card charge with the reseller's name, automatically by the system. The reseller could be allowed access to view all of the information for the subscribers through their service, through an account allowing access to multiple customers' information.

A possible embodiment could include a variety of different privileges for various User accounts. Some accounts could be created such that those Users would have administrative privileges over other accounts with the same customer. The User with administrative privileges could create new User accounts with varying privileges, or delete or change existing accounts. Varying types of privileges could be restricted, such as certain Users could only view test results, certain Users could create or modify tests, and Users could be restricted to a subset of tests based on defined parameters.

The user-interface in a possible embodiment could be modified to obtain data from outside sources specified by a User to display along with the charts and graphs displaying test information. This would allow a user to correlate outside data sources with performance information about their network servers to help when diagnosing problems. For example, a bandwidth graph showing bandwidth usage by a network server could be displayed alongside the performance data of the network server, allowing a User to easily see how performance and bandwidth usage correlate. To obtain the data for the bandwidth graph, the User may specify an outside data source that would be contacted by the User-Interface Machine to obtain the data allowing it to draw a bandwidth graph. The outside data may be made available in XML format, CSV or any other known format that would allow the user-interface to obtain the data and plot an appropriate graph.

4.0 Hardware Overview

Figure 8:
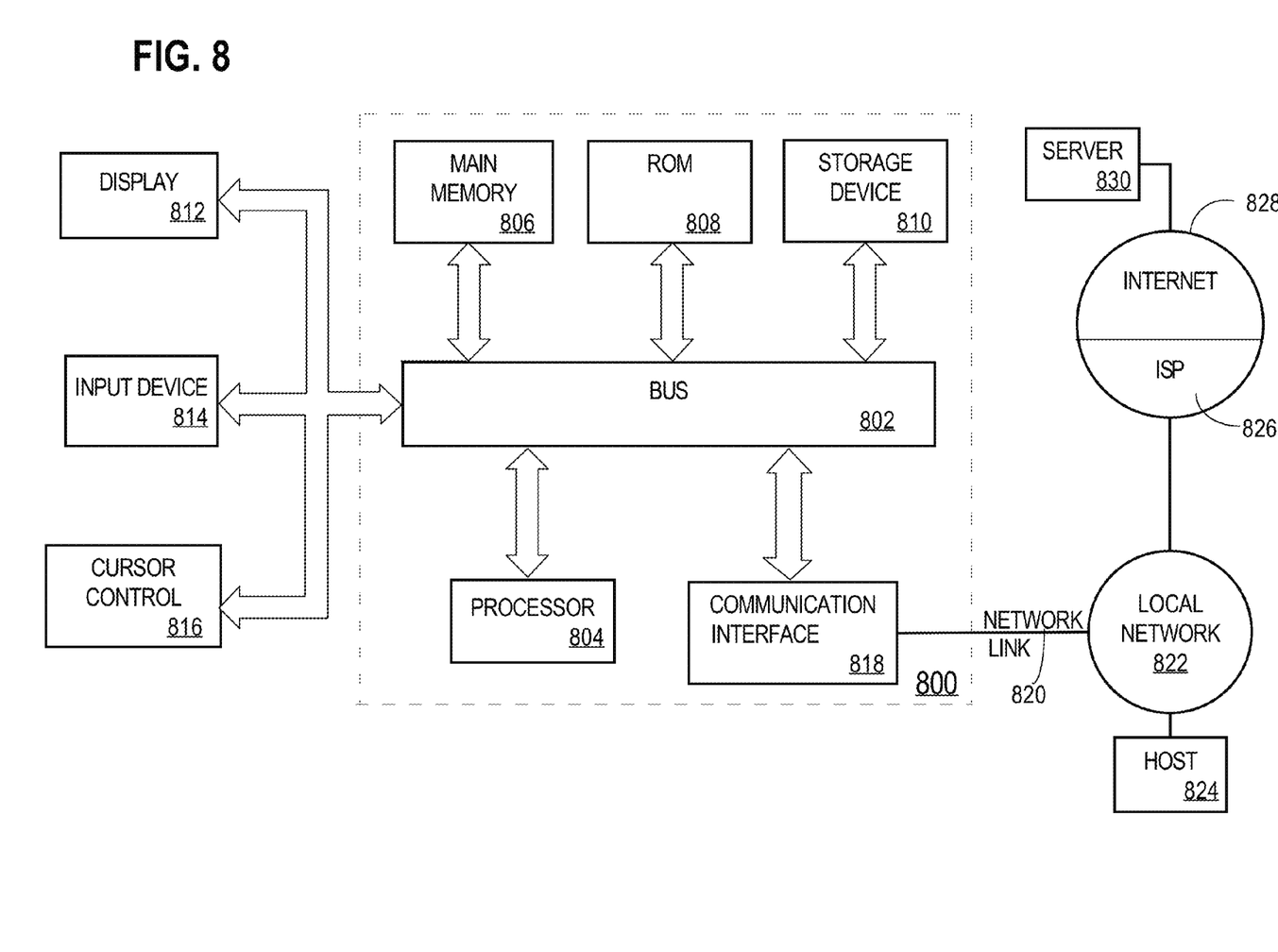
FIG. 8 illustrates a computer system upon which a possible embodiment may be implemented.

FIG. 8 is a block diagram that illustrates one of the computer system servers 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one possible embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In a possible embodiment implemented using computer system 800, various machine-readable media are involved, for example, in providing instructions to processor 804 for execution. Such a medium may take many forms, including but not limited to storage media and transmission media. Storage media includes both non-volatile media and volatile media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) or co-location facility 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

5.0 Examples

In an embodiment, a method comprises or a computer-readable medium carrying one or more sequences of instructions, which instructions, when executed by one or more processors, cause the one or more processors to carry out the steps of: running one or more web client applications in one or more guest operating systems on an agent machine among a plurality of agent machines using virtualization to run the one or more guest operating systems, the one or more web client applications executing tests scheduled by a test scheduler among one or more test schedulers, and the one or more web client applications communicating with one or more networked servers during test execution; collecting, at an agent machine, application layer data related to test execution for a web client application of the one or more web client applications; and collecting, at the agent machine, network layer data related to interaction during test execution between the web client application of the one or more web client applications and the one or more networked servers, storing the application layer data and the network layer data, and wherein the stored application layer data and the stored network layer data are aggregated and presented to a user via a user interface.

In an embodiment, a method or computer-readable medium further comprises wherein the application layer data is collected by code that executes in the guest operating system that is running on the agent machine and the network layer data is collected by code that executes on the host operating system of the agent machine.

In an embodiment, a method or computer-readable medium further comprises wherein the application layer data is collected by code that executes in the guest operating system that is running on the agent machine and the network level data is also collected by code that executes in the guest operating system that is running on the agent machine.

In an embodiment, a method or computer-readable medium further comprises wherein the web client application is a web browser and at least one networked server of the one or more networked servers tested is an Internet web server.

In an embodiment, a method or computer-readable medium further comprises wherein the web client application is any of: an Internet based multiplayer game or an Internet video player.

In an embodiment, a method or computer-readable medium further comprises wherein tests scheduled include scripts that include multiple, sequential operations for the web client application to execute.

In an embodiment, a method or computer-readable medium further comprises wherein the web client application is a web browser and the script to execute includes a URL of a web page to load and a button to be pressed.

In an embodiment, a method or computer-readable medium further comprises wherein the application layer data collected includes any combination of: screen captures and a trace of library function calls.

In an embodiment, a method or computer-readable medium further comprises wherein a sniff of TCP network traffic is part of the network layer data collected.

In an embodiment, a method or computer-readable medium further comprises wherein data related to the activity of the local DNS server associated with each guest operating system is collected during the test.

In an embodiment, a method or computer-readable medium further comprises wherein use of the testing framework is sold as a subscription service based on amount of time reserved on the testing framework or usage of the testing framework.

In an embodiment, a method or computer-readable medium further comprises wherein additional tests are performed based on results of a first test.

In an embodiment, a method or computer-readable medium further comprises wherein electronic mail is sent to notify a user of test results or exceptional events.

In an embodiment, a method or computer-readable medium further comprises wherein the user-interface is displayed on a user-interface machine among one or more user-interface machines that are web servers that deliver dynamically generated web pages that contain information about the tests performed.

In an embodiment, a method or computer-readable medium further comprises wherein tests are performed over time at exact regular intervals.

In an embodiment, a system comprises a plurality of agent machines using virtualization to run one or more guest operating systems; one or more web client applications that are run in the guest operating systems on the agent machines, the one or more web client applications execute tests scheduled by a test scheduler of the one or more test schedulers, and the one or more web client applications communicate with one or more networked servers during test execution; an application layer data collecting subsystem, at an agent machine, that collects application layer data related to test execution for a web client application; and a network layer data collecting subsystem, at the agent machine, that collects network layer data related to interaction during test execution between the web client application and the one or more networked servers, a data storing subsystem that stores the application layer data and the network layer data, and wherein the stored application layer data and the stored network layer data are aggregated and presented to a user via a user-interface subsystem.

In an embodiment, a system further comprises an application layer data collection subsystem that operates in the guest operating system that is running on the agent machine and collects the application layer data; and a network layer data collection subsystem that operates in the host operating system of the agent machine and collects the network layer data.

In an embodiment, a system further comprises an application layer data collection subsystem that operates in the guest operating system that is running on the agent machine and collects the application layer data; and a network layer data collection subsystem that operates in the guest operating system that is running on the agent machine and collects the network level data.

In an embodiment, a system further comprises wherein the web client application is a web browser and at least one networked server of the one or more networked servers tested is an Internet web server.

In an embodiment, a system further comprises wherein the web client application is any of: an Internet based multiplayer game or an Internet video player.

In an embodiment, a system further comprises wherein tests scheduled include scripts that include multiple, sequential operations for the web client application to execute.

In an embodiment, a system further comprises wherein the web client application is a web browser and the script to execute includes a URL of a web page to load and a button to be pressed.

In an embodiment, a system further comprises wherein the application layer data collected includes any combination of: screen captures and a trace of library function calls.

In an embodiment, a system further comprises wherein a sniff of TCP network traffic is part of the network layer data collected.

In an embodiment, a system further comprises wherein data related to the activity of the local DNS server associated with each guest operating system is collected during the test.

In an embodiment, a system further comprises wherein use of the testing framework is sold as a subscription service based on amount of time reserved on the testing framework or usage of the testing framework.

In an embodiment, a system further comprises wherein additional tests are performed based on results of a first test.

In an embodiment, a system further comprises wherein electronic mail is sent to notify a user of test results or exceptional events.

In an embodiment, a system further comprises wherein the user-interface subsystem resides on a user-interface machine among one or more user-interface machines that are web servers that deliver dynamically generated web pages that contain information about the tests performed.

In an embodiment, a system further comprises wherein tests are performed over time at exact regular intervals.

6.0 Extensions and Alternatives

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method, comprising:
   running, on each agent machine in a plurality of agent machines, one or more guest operating systems using virtualization;
   running one or more web client applications in the one or more guest operating systems on each of the agent machines in the plurality of agent machines, the one or more web client applications execute scheduled tests involving interaction with one or more networked servers, and the one or more web client applications communicate with the one or more networked servers during scheduled test execution, wherein at least one of the web client applications of the one or more web client applications is an Internet video player;

collecting, at an agent machine in the plurality of agent machines, application layer data and network layer data related to scheduled test execution for a web client application running in the one or more guest operating systems on the agent machine;

storing the test data, wherein differences between data in two scheduled tests is stored, the differences stored includes differences between any of: screen captures or window captures.

2. The method of claim 1, further comprising:
aggregating and presenting the stored test data to a user via a user-interface display.

3. The method of claim 1, wherein differences between data in two scheduled tests is stored.

4. The method of claim 3, wherein the differences stored includes differences between HTML pages.

5. The method of claim 1, wherein additional tests are performed when an error condition is encountered during a test.

6. The method of claim 5, wherein the additional tests performed include sending Internet Control Message Protocol (ICMP) packets.

7. A distributed testing framework, comprising:
at least one processor;
a plurality of agent machines, each agent machine in the plurality of agent machines using virtualization to run one or more guest operating systems;
one or more web client applications that are run in the one or more guest operating systems on each of the agent machines in the plurality of agent machines, the one or more web client applications execute scheduled tests involving interaction with one or more networked servers, and the one or more web client applications communicate with the one or more networked servers during scheduled test execution, wherein at least one of the web client applications of the one or more web client applications is an Internet video player;
a data collecting subsystem, at an agent machine in the plurality of agent machines, that collects application layer data and network layer data related to scheduled test execution for a web client application running in the one or more guest operating systems on the agent machine; and
a data storing subsystem that stores the test data, wherein differences between data in two scheduled tests is stored, the differences stored includes differences between any of: screen captures or window captures.

8. The system of claim 7, further comprising:
a user-interface display subsystem that aggregates and presents the stored test data to a user.

9. The system of claim 7, wherein differences between data in two scheduled tests is stored.

10. The system of claim 9, wherein the differences stored includes differences between HTML pages.

11. The system of claim 7, wherein additional tests are performed when an error condition is encountered during a test.

12. The system of claim 11, wherein the additional tests performed include sending Internet Control Message Protocol (ICMP) packets.

13. A non-transitory computer-readable medium storing one or more sequences of instructions, which instructions, when executed by one or more processors, cause the one or more processors to carry out the steps of:
running, on each agent machine in a plurality of agent machines, one or more guest operating systems using virtualization;
running one or more web client applications in the one or more guest operating systems on each of the agent machines in the plurality of agent machines, the one or more web client applications execute scheduled tests involving interaction with one or more networked servers, and the one or more web client applications communicate with the one or more networked servers during scheduled test execution, wherein at least one of the web client applications of the one or more web client applications is an Internet video player;
collecting, at an agent machine in the plurality of agent machines, application layer data and network layer data related to scheduled test execution for a web client application running in the one or more guest operating systems on the agent machine;
storing the test data, wherein differences between data in two scheduled tests is stored, the differences stored includes differences between any of: screen captures or window captures.

14. The non-transitory computer-readable medium of claim 13, further comprising:
aggregating and presenting the stored test data to a user via a user-interface display.

15. The non-transitory computer-readable medium of claim 3, wherein differences between data in two scheduled tests is stored.

16. The non-transitory computer-readable medium of claim 15, wherein the differences stored includes differences between HTML pages.

17. The non-transitory computer-readable medium of claim 13, wherein additional tests are performed when an error condition is encountered during a test.

18. The non-transitory computer-readable medium of claim 17, wherein the additional tests performed include sending Internet Control Message Protocol (ICMP) packets.

* * * * *